(12) United States Patent
Giusti et al.

(10) Patent No.: US 12,145,230 B2
(45) Date of Patent: Nov. 19, 2024

(54) DEVICE FOR MACHINING A WORKPIECE EQUIPPED WITH AN AIR SYSTEM

(71) Applicant: EPUR, Rodome (FR)

(72) Inventors: Pierre Giusti, Espezel (FR); Denis Vinet, Belbeze en Comminges (FR); Olivier Clair, Rodome (FR)

(73) Assignee: EPUR, Rodome (FR)

( * ) Notice: Subject to any disclaimer, the term of this patent is extended or adjusted under 35 U.S.C. 154(b) by 0 days.

(21) Appl. No.: 18/022,197

(22) PCT Filed: Aug. 16, 2021

(86) PCT No.: PCT/EP2021/072689
§ 371 (c)(1),
(2) Date: Feb. 20, 2023

(87) PCT Pub. No.: WO2022/038078
PCT Pub. Date: Feb. 24, 2022

(65) Prior Publication Data
US 2023/0321777 A1 Oct. 12, 2023

(30) Foreign Application Priority Data

Aug. 18, 2020 (FR) ........................................ 2008556

(51) Int. Cl.
*B23Q 11/00* (2006.01)
*B23Q 11/08* (2006.01)
(52) U.S. Cl.
CPC .......... *B23Q 11/006* (2013.01); *B23Q 11/085* (2013.01)

(58) Field of Classification Search
CPC .... B23Q 11/005; B23Q 11/006; B23Q 11/085
See application file for complete search history.

(56) References Cited

U.S. PATENT DOCUMENTS

| 3,587,387 | A | * | 6/1971 | Burrows | .................. | B27C 5/10 |
| | | | | | | 408/239 R |
| 4,613,261 | A | * | 9/1986 | Maier | ...................... | B27C 5/10 |
| | | | | | | 409/137 |
| 5,238,336 | A | * | 8/1993 | Sanders | .............. | B25H 1/0092 |
| | | | | | | 408/112 |
| 7,799,104 | B2 | * | 9/2010 | Valentini | ............ | B01D 46/2411 |
| | | | | | | 55/498 |

(Continued)

*Primary Examiner* — Andrew M Tecco
*Assistant Examiner* — Nicholas E Igbokwe
(74) *Attorney, Agent, or Firm* — CRGO Global; Steven M. Greenberg

(57) ABSTRACT

Device for machining a workpiece (10) comprising a housing (200), at least one machining head (210) carrying a machining tool (211), characterized in that it comprises an air system (300) for evacuating the chips produced during the machining of said workpiece (10) comprising: an air inlet (301) and an air outlet (302) and an air flow channel (303); a means (304) for causing an air flow to flow in said air flow channel (303); and an air passage through-hole (305) delimiting said air outlet, through which said machining tool (211) extends so that said air flow caused to flow in said air channel can be expelled from said housing through said through-hole in order to repel said chips produced by said machining tool out of said enclosure (201) of said housing.

7 Claims, 3 Drawing Sheets

(56) References Cited

U.S. PATENT DOCUMENTS

| | | | | |
|---|---|---|---|---|
| 2005/0286983 A1* | 12/2005 | Janson | ................ | B23Q 11/005 409/137 |
| 2010/0048110 A1* | 2/2010 | Yin | ...................... | B23Q 11/08 451/456 |
| 2010/0189524 A1* | 7/2010 | Yin | ...................... | B23Q 11/08 409/137 |
| 2017/0304908 A1* | 10/2017 | Travert | ............. | B23Q 3/15706 |
| 2018/0126506 A1* | 5/2018 | Takahara | .......... | B23Q 11/0046 |

* cited by examiner

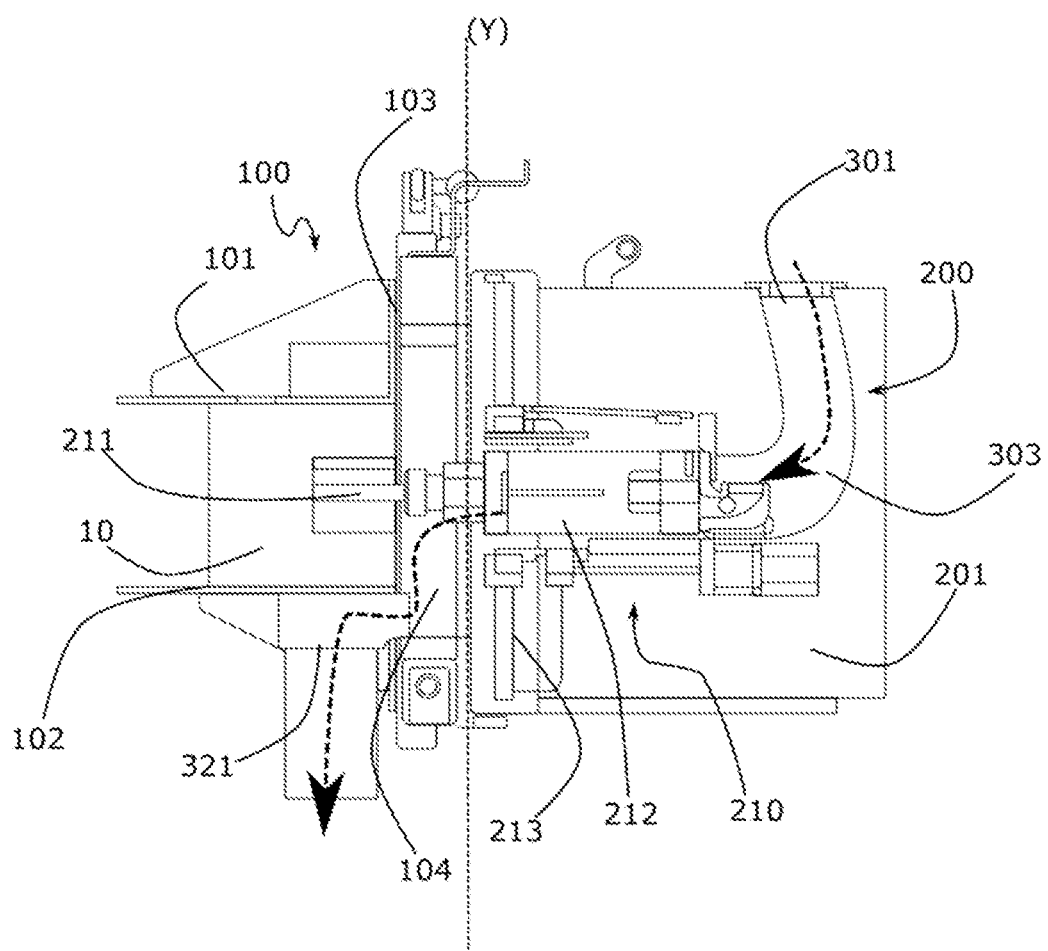
[Fig. 1]

[Fig. 2]
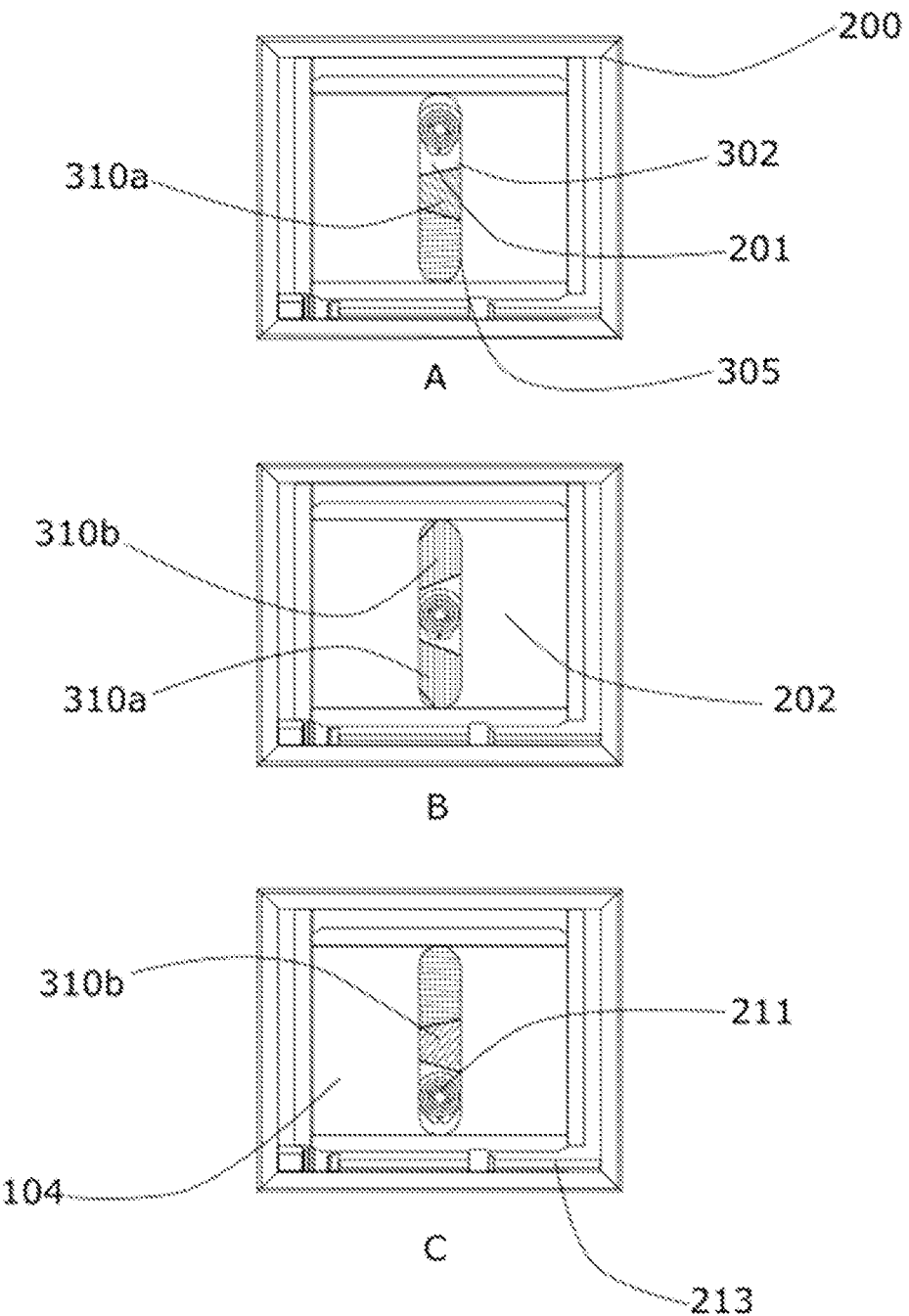

[Fig. 3]
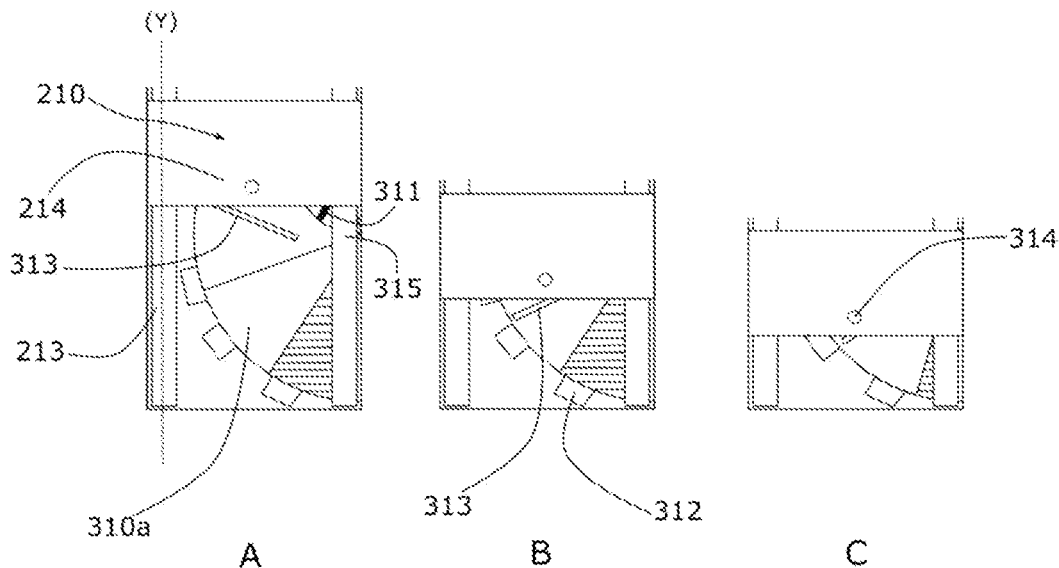
[Fig. 4]
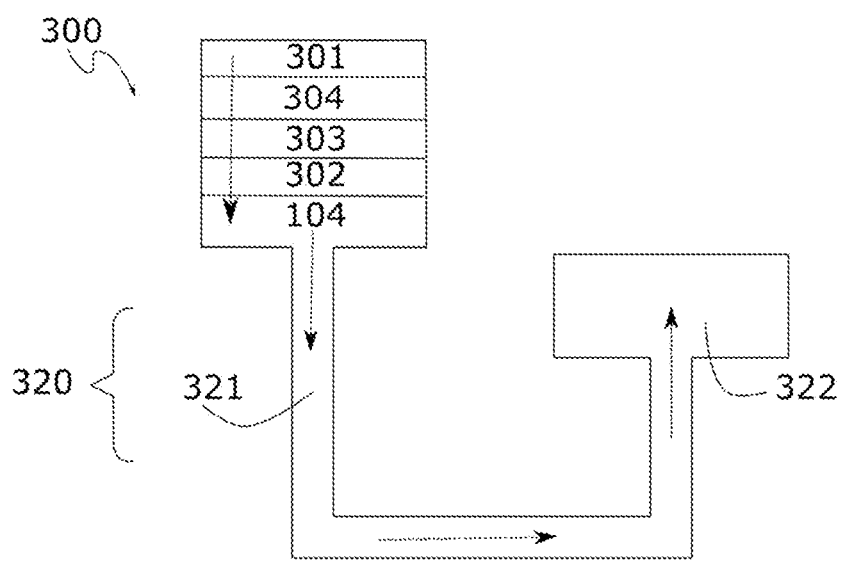

DEVICE FOR MACHINING A WORKPIECE EQUIPPED WITH AN AIR SYSTEM

CROSS-REFERENCE TO RELATED APPLICATIONS

This application is a § 371 national phase entry of International Application No. PCT/EP2021/072689, filed Aug. 16, 2021, which claims priority to French Patent Application No. 2008556 filed on Aug. 18, 2020.

TECHNICAL FIELD OF THE INVENTION

The invention relates to a device for machining a workpiece, such as a piece of wood, the machine being equipped with an air system for evacuating chips produced during the machining of said workpiece. The invention also relates to a portable machining device intended for the carpentry trades.

TECHNOLOGICAL BACKGROUND

There are a number of types of machining device which make possible machining of a workpiece such as a piece of wood to be carried out. The use of manual machining devices is known, these each being equipped with a specific tool, such as a saw, a plane, etc. which are handled directly by an operator in order to machine the piece of wood. Digitally controlled machining devices are also used and each comprise a chassis which rests on the floor at the machining site, a cutting tool or a machining tool mounted on the chassis, means for automatically driving the cutting tool and means for receiving the piece of wood to be machined. In its patent FR3050135, and specifically its application FR2000758, the Applicant has already proposed a machine tool which forms a new family of machining devices. The proposed machine tool is a portable device for automated machining of a piece of wood. Such a device comprises a housing which is fixed directly to the piece of wood to be machined and a digitally controlled machining head housed in the housing. The disadvantage common to all these devices is the production of chips and of dust in the form of particles of wood around the workspace of the operator during the machining of a workpiece such as a piece of wood. Thus, as the workpiece is being machined, the wood chips and dust produced are dispersed over the floor of the machining site in the operator's workshop. The chips on the floor therefore pose a risk for the operator who could slip and fall on the floor. In the case of a digitally controlled machining device or a portable automated machining device, the chips and the dust can get into the housing of the machining device and cause damage by ruining the various elements forming the machining device. Furthermore, there is also a risk to the health of the operator who could inhale the wood chips and dust.

The Applicant has therefore sought to improve the machining device, and in particular the portable machining device, so as to manage the chips and dust generated during the machining of a workpiece.

AIMS OF THE INVENTION

The invention thus aims to provide a device for machining a workpiece, in particular a piece of wood, which makes it possible to avoid damaging the constituent elements of the device by the chips and dust produced during the machining of the workpiece.

The invention also aims to provide, in at least one embodiment, a device for machining a workpiece, which additionally makes it possible to cool the actuator of the machining tool of the device.

The invention also aims to provide, in at least one embodiment, a machining device which facilitates the collection of the chips produced during the machining of a workpiece.

The invention aims in particular to provide, in at least one embodiment, a machining device which makes it possible to avoid chips collecting on the floor of the machining site.

The invention also aims to provide, in at least one embodiment, a machining device which makes it possible to improve the safety of the operator who is handling such a machining device.

DESCRIPTION OF THE INVENTION

In order to do this, the invention relates to a device for machining a workpiece comprising a housing delimiting an enclosure, at least one machining head carrying a machining tool housed in said housing, and means for moving said machining tool on at least one Y axis.

The machining device in accordance with the invention is characterized in that it further comprises an air system for evacuating the chips produced during the machining of said workpiece, said air system comprising:
  an air inlet and an air outlet which are provided in said housing and an air flow channel which extends between the air inlet and outlet;
  a means for causing an air flow to flow in said air flow channel between the inlet and outlet; and
  an air passage through-hole delimiting said air outlet through which said machining tool extends so that said air flow caused to flow in said air channel can be expelled from said housing through said through-hole in order to repel said chips produced by said machining tool during the machining of said workpiece out of said enclosure of said housing.

The machining device in accordance with the invention thus has the feature of integrating an air system for evacuating the chips produced during the machining of a workpiece.

This particular structure of the machining device in accordance with the invention can thus make it possible to prevent the chips from entering the enclosure of the housing. In particular, the machining device in accordance with the invention makes it possible to avoid damaging the elements housed in said enclosure of the housing, such as the machining head or the means for moving said machining tool. This also makes it possible to avoid blocking the machining head by ensuring that no machining chip becomes wedged in the means for moving the machining head.

The means for causing an air flow to flow can be e.g. a dedicated venting system permitting the flow of an air flow in the air flow channel. The enclosure of the housing is preferably sealed so that the air entering via said inlet can exit only via said outlet after having flowed in said flow channel. Consequently, the air flow expelled from said enclosure via said air passage through-hole forms an air curtain which prevents the introduction of the chips produced by the machining into the enclosure of the housing.

According to one variant of the invention, said machining device is portable, in particular hand-carried, i.e. it can be carried in the hand by an operator as described in patent application FR2000758 filed in the name of the applicant.

Furthermore, the machining device in accordance with one advantageous variant comprises means for moving the machining tool in at least one direction of translation (X, Y, Z) in order to carry out machining of the workpiece and a digital control unit configured to be able to control said means for moving the machining tool in each direction of translation.

Advantageously and in accordance with the invention, said machining head comprises an actuator for said machining tool housed in said air flow channel.

The device according to this variant thus has the feature of integrating the actuator of the machining tool in said flow channel of the air system so that the actuator can be cooled by the air flow flowing in the flow channel.

In other words, an air system of a machining device according to this variant has a dual function: cooling the actuator by means of the air flow and preventing the introduction of chips or dust into said enclosure of the housing.

Furthermore, a machining device according to this variant makes it possible to dispense with dedicated venting for the actuator of the machining tool. For example, the actuator is an electric motor for driving the machining tool configured to ensure that the machining tool is caused to rotate.

Advantageously and in accordance with the invention, said machining device further comprises at least one shutter for partial closure of said air passage through-hole defining an air passage section S, said shutter(s) being movable with respect to said through-hole so as to be able to delimit an air passage section S1 limiting said air passage section S which makes it possible to increase the speed of the air flow expelled from said housing via said air outlet.

According to this advantageous variant, said air passage through-hole defines an air passage section S which is limited by the presence of at least one shutter for partial closure of the air passage through-hole. Therefore, at least one shutter is arranged to permit partial closure of said air passage through-hole thus delimiting an air flow passage section S1 which is restricted with respect to the air flow passage section S.

According to a preferred variant, said machining device comprises two closure shutters which jointly delimit the air flow passage section S1.

The partial closure of the air passage through-hole makes it possible to restrict the air passage section S in order to increase the speed of the air flow which passes through the section S1. Thus an air delivery is generated which makes it possible to repel the chips produced during the machining out of the enclosure of the housing.

The air flow through the air passage section S is thus partially hindered by the shutters so as to reduce this air flow passage section with a view to increasing the speed of the air flow. A Venturi effect is thus generated. The air flow is actually forced to occupy the air passage section S1 delimited by the closure shutters, which is narrower than the air passage section S, which causes the acceleration of the air flow constituting the Venturi effect. The air flow accelerated at the outlet forms an air curtain which makes it possible to avoid the chips entering the enclosure of the housing.

According to one variant, the passage section S1 can be defined depending on the type of machining tool mounted on the machining head. In other words, the passage section S1 is dimensioned depending on the geometry of the machining tool (milling machine, circular saw, plane etc.) mounted on the machining head, in particular the diameter and the profile of the machining tool.

Advantageously and in accordance with the invention, said air passage through-hole is of an oblong shape extending on said Y axis.

According to this advantageous variant, said air passage through-hole is of an oblong shape which extends on the Y axis so as to permit the movement of said machining tool on this Y axis while permitting the air passage section S to be minimized.

According to this variant, said partial closure shutters are movable on the Y axis which is preferably the axis defined by the direction of gravity.

Advantageously and in accordance with the invention, said machining device comprises means for returning each closure shutter, which are mechanically connected to said means for moving said machining tool on said Y axis so as to permit the concomitant movement of each partial closure shutter and of said machining tool in order to keep said air passage section S1 constant.

A device according to this advantageous variant makes it possible to activate the movement of at least one closure shutter with respect to the air passage through-hole by return means. These return means are configured to permit the movement of the shutters simultaneously with the movement of the machining tool, which causes the movement of said air flow passage section S1 during movement of the machining tool on the Y axis.

Furthermore, the mechanical connection between each shutter and the movement means can be direct or indirect, e.g. a shutter is connected to the movement means directly, or indirectly by being connected to another element which moves when the movement means move, the other element being e.g. another shutter.

According to one variant, a spacing distance is maintained between at least two partial closure shutters so as to retain the air passage section S1. In other words and according to this advantageous variant, said section S1 is kept constant when said machining tool is caused to move by the movement means. The expression "said section S1 is kept constant" is understood to mean that the air passage is minimized with respect to the section S. For example, the surface of the passage section S1 constitutes one third of the surface of the passage section S during movement of the closure shutters. This constancy of the section S1 makes it possible to ensure the acceleration of the air flow no matter what position the machining tool is in.

The return means mechanically connected to the movement means are configured to control the movement of the closure shutters during the simultaneous movement of the machining tool. Said means for moving the machining tool correspond to the means for moving the machining head carrying the machining tool. Said means for moving the machining tool on the Y axis comprise e.g. ball-bearing runners.

Advantageously and in accordance with the invention, said machining device comprises a first and a second shutter and said means for returning each partial closure shutter comprise at least one return spring configured to keep said first shutter at a distance from said second shutter so as to keep said air flow passage section S1 constant when said means for moving said machining tool are actuated.

According to this advantageous variant, the return means used comprise at least one spring permitting said shutters delimiting the air passage section S1 to be kept at a distance. Each shutter is connected to a spring so as to be moved during the movement of said machining tool. The shutters are preferably connected to each other by means of a spring and guide means permitting each shutter to be moved when the means for moving the machining tool are actuated.

The guide means comprise e.g. a pivot axis, about which the shutters pivot in order to move said air passage section S1 when the machining head is caused to move by said movement means.

Advantageously and in accordance with the invention, said air system further comprises an aspirating device comprising a chip collector connected to an aspirating channel opening in the vicinity of said air passage through-hole in order to permit entry of the chips produced during the machining and repelled by said air flow expelled from said housing towards said collector.

According to this variant, the air system comprises an aspirating channel in which the chips produced during the machining of the workpiece are repelled by the air flow expelled from said housing. Said chips are then aspirated by an aspirating device which evacuates the chips into a chip collector.

An air system of this type makes it possible at the same time to ensure that the chips produced during the machining do not enter the enclosure of the housing and to facilitate the collection of the chips in order to keep the working environment clean.

The chip collector can be e.g. a sealed receptacle connected to the aspirating channel. The collector can also be formed by a chip-receiving bag, and generally by any means permitting collection of the chips produced during the machining and evacuated via the aspirating channel.

Advantageously and in accordance with the invention, the machining device further comprises a system for confining said chips, which is configured to delimit a machining space around said machining tool so as to limit the dispersal of said chips during the machining of said workpiece by the machining tool.

A device according to this variant comprises a system for confining the chips, which permits a machining space to be delimited, beyond which the chips cannot be dispersed. The installation of said confining system makes it possible to limit the dispersal of the chips produced during the machining in order to facilitate the aspiration of the chips by the aspirating device of the invention.

According to another variant, the confining system is a protective canvas connected to rollers so as to be able to define a machining space, preferably once the machining device is mounted on the piece of wood to be machined. These rollers are e.g. carried by the housing of the machining device.

Once the machining device is fixed to the piece of wood to be machined, the operator can pull on the protective canvas which thus unwinds from the rollers in order to cover the machining zone. A roller can be provided on each side, the canvas of each roller thus being deployed as far as the piece of wood to be machined. A means for locking the canvas, such as a hook, can thus be provided to keep the canvas in position during the machining. Thus, the protective canvas makes it possible to delimit the machining zone and to gather the chips before they are aspirated by the aspirating device.

According to another variant, the machining device further comprises a clamping module configured to be able to be fixed to a workpiece. Said housing is intended to be mounted on the clamping module by removable mounting means. According to this variant, the rollers are carried directly by the clamping module.

Advantageously and in accordance with this variant, said workpiece is a piece of wood.

The machining device in accordance with the invention is particularly intended for machining pieces of wood. This being the case, a device in accordance with the invention can also be used to machine other types of workpieces and in particular workpieces made of synthetic material, pieces of concrete, pieces of metal and generally any type of workpiece requiring machining. The machining tool must be adapted to the type of material of the workpiece.

The invention also relates to a machining device characterized in combination by all or some of the features mentioned above or below.

LIST OF FIGURES

Other aims, features and advantages of the invention will become apparent upon reading the following description given solely in a non-limiting way and which makes reference to the attached figures in which:

FIG. 1 is a schematic view of a machining device during the machining of a workpiece in accordance with one embodiment of the invention.

FIG. 2 is a schematic front view of a wall of the housing comprising the air passage through-hole illustrated in three distinct positions (A, B and C) in order to show the movement of the machining tool on the Y axis.

FIG. 3 is a schematic rear view of the wall according to FIG. 2 illustrating the analogous positions A, B and C of FIG. 2 when the machining tool moves on the Y axis.

FIG. 4 is a diagram illustrating the air flow circuit permitting the chips to be channelled towards a collector.

DETAILED DESCRIPTION OF AN EMBODIMENT OF THE INVENTION

In the figures, for the sake of illustration and clarity, scales and proportions have not been strictly respected. Throughout the detailed description which follows with reference to the figures, unless stated to the contrary, each element of the machining device is described as it is arranged when the machining device of which it forms part is mounted on a workpiece. This configuration is illustrated in particular in FIG. 1. Identical, similar or analogous elements are designated by the same reference signs in all the figures.

Furthermore, the machining tool moves on at least one X, Y and Z axis. The X, Y and Z axes are perpendicular to each other and correspond respectively to the translation directions (X, Y, Z) of the machining tool. The translation Y axis is perpendicular to the X axis and parallel to the plane formed by a wall of the housing, referred to as the front wall. The Y axis preferably defines the direction of gravity.

FIG. 1 schematically illustrates a machining device according to one embodiment of the invention which comprises an air system for evacuating chips produced during the machining of a piece of wood. The dashed arrows illustrate the flow of the air flow in said air flow channel between the inlet and outlet.

According to this embodiment, the machining device is portable and comprises a clamping module 100 configured to be able to be fixed to a workpiece 10 by removable fixing means; and a housing 200 intended to be mounted on the clamping module 100 by removable mounting means.

The clamping module 100 also comprises two tables 101, 102 extending parallel to each other and delimiting a jaw for gripping the piece of wood 10 to be machined and a chassis 103 fixed to the housing 200 to form the machining device 20.

According to this embodiment, the housing 200 has a parallelepiped shape comprising a front face, or a front wall 202, of the housing which is located facing the workpiece. FIG. 2 schematically illustrates the front wall 202 of the housing 200 in which are arranged the air flow passage through-hole 305 and the air passage section S1 delimited by two partial closure shutters 310a; 310b.

The structure and operation of the air system 300 for evacuating the chips produced during the machining is described hereinunder.

As illustrated in FIG. 1, the machining device comprises a housing 200 delimiting an enclosure 201 and accommodating a machining head 210. The housing is formed e.g. of sheet metal and has an inlet 301 and an outlet 302 which is arranged on the front wall 202 of the housing comprising said air passage through-hole, the inlet and the outlet each forming a venting opening. According to this embodiment, the machining tool is caused to rotate by an actuator 212. A fan of the actuator 212 of the machining tool 211 makes it possible to cause the air to enter via the inlet 301, which flows in the flow channel 303 before exiting via the outlet 302 through which the machining tool 211 extends.

The air flow enters via the inlet 301 arranged upstream of the flow channel 303 in order to cool the actuator 212 which extends in the channel. The channel 303 is formed by a flexible type duct directly connected downstream of the inlet 301 of the housing and which issues into the enclosure 201 of the housing upstream of the outlet 302. A fan for cooling the actuator 212 forms the means 304 for causing an air flow to flow. According to this embodiment, the fan for cooling the actuator 212, housed in the air flow channel, ensures the flow of air in the air flow channel 303. In order to do this, the actuator 212 comprises orifices through which the air flow passes. The air exiting the orifices in the actuator then flows in the enclosure of the housing. This air brings about an increase in the pressure in the enclosure 201 of the housing and therefore causes an expulsion of the air flow out of the housing via the passage section S1 delimited by the partial closure shutters of the air passage through-hole 305 through which the machining tool extends.

The machining head 210 housed inside the housing 200 comprises e.g. a tool holder configured to be able to receive a machining tool 211 such as a router. The machining tool is caused to move by the means 213 for moving the machining tool.

The housing 200 is movably mounted on the clamping module 100, which is free in translation, with respect to the front wall of the housing, on an X axis by virtue of two ball-bearing runners. The X axis is parallel to the plane formed by the front wall. The movement is ensured by a stepping motor configured to cause an worm gear to turn, one end of which is fixedly attached to the clamping module.

According to this embodiment, the housing 200 is free in translation on the X axis with respect to the chassis 103, the machining head comprising the machining tool is free in translation on the Y axis with respect to the housing and the tool holder mounted on the machining head is free in translation on the Z axis with respect to the machining head.

The means 213 for moving the machining tool comprise e.g. ball-bearing runners and the movement is ensured by a stepping motor configured to cause a worm gear to turn. The operating principle of the machining device as such is e.g. the principle described in the patent FR3050135 in the name of the applicant.

The machining device further comprises a digital control unit not shown in the figures and configured to be able to control the means for moving the machining tool. This control unit is e.g. controlled by a remote control device with a touch screen intended to be operated by the operator controlling the machining of the piece of wood 10 by the machining device in accordance with the invention.

FIG. 2 shows an external view of the front wall 202 of the housing 200. The configurations A, B and C respectively show the position of the machining tool in a high position, an intermediate position and a low position when it is moved in the air flow passage through-hole 305. FIG. 3 illustrates an internal view of the front wall 202 as shown in FIG. 2. Therefore, in an analogous manner, FIGS. 3A, 3B and 3C illustrate a high, intermediate and low position of the machining tool.

As illustrated in FIG. 2, the air flow passage through-hole delimiting the outlet 302 is oblong and extends on a Y axis defining, in this embodiment, the direction of gravity. According to other embodiments, the Y axis can be any axis other than that defining the direction of gravity.

Two shutters 310a and 310b are illustrated in the three positions A, B and C depending on the movement of the machining tool 211 in the air flow passage through-hole 305. The air flow passage is partially closed by the two shutters 310a and 310b for partial closure of said air passage through-hole, which are able to move with respect to said through-hole in order to delimit the air flow passage section S1. The shutters 310 are each arranged so as to close an end of the passage through-hole 305 in order to delimit the passage section S1.

In the high position (A), the machining tool is arranged at a first end of the air flow passage through-hole 305. Therefore, the shutter 310a is in a deployed position and the shutter 310b in a folded position to delimit the passage section S1.

The shutters 310a; 310b are each moved in translation by a spring corresponding to the return means 311 as illustrated by FIG. 3. For the sake of clarity, only the shutter 310a is shown in FIG. 3. Each shutter comprises a first and a second leaf configured to transit from a deployed position in which the first leaf and the second leaf are deployed and can overlap to a folded position in which the first leaf is superimposed on the second leaf and vice versa. The transition from the deployed position to the folded position and vice versa is enabled by the movement of the machining head in the direction Y by virtue of ball-bearing runners 213 forming the means for moving the machining head.

Each leaf rotates about a pivot axis 315 so as to pivot the shutter 310a in order to transit from the deployed position to the folded position and vice versa.

According to this embodiment, the spring is connected on the one hand to the first shutter 310a and on the other hand to the second shutter 310b (not shown in FIG. 3). Thus when the first shutter 310a is in the folded position, the second shutter 310b is in the deployed position and vice versa.

The return means permit the concomitant movement of each of the shutters 310a and 310b. Therefore, the shutters move with respect to each other by virtue of the spring 311 but are also driven by the movement of the machining tool.

FIG. 3A shows the shutter 310a comprising a first and a second leaf able to overlap in the deployed position so as to partially close the air passage through-hole 305 in order to delimit the section S1.

In the intermediate position (B), the machining tool is arranged at the centre of the air flow passage through-hole 305 when the shutters 310a and 310b are in an intermediate position in which they are partially deployed in order to delimit the passage section 51. FIG. 3B illustrates the shutter 310a, the first leaf of which partially overlaps the second leaf during movement of the machining head with respect to the passage through-hole.

In order to transit from a deployed position to a folded position, the shutters have intermediate positions corresponding to the intermediate movement positions of the machining tool carried by the machining head depending on the means for moving between the first end and the second end of the air flow passage through-hole. For example, the shutter can be likened to a fan which can be deployed during use and folded to be stored after use.

In the low position (C), the machining tool is arranged at the second end of the air flow passage through-hole 305 when the shutter 310a is in a folded position as illustrated by FIG. 3B and the shutter 310b is in a deployed position (not illustrated in FIG. 3B).

As illustrated by FIG. 3C, the first leaf is superimposed on the second leaf so as to be stacked one on the other when the shutter 310a is in the folded position. Thus, the shutter 310a arranged inside the housing in the vicinity of the front wall 202 is folded on itself at one end of the front wall 202. This configuration makes it possible to limit the size of the shutter and to keep the shutter folded in the enclosure of the housing.

The shutter comprises two leaves made of steel. Furthermore, the shutters are housed inside the housing 200 and are held against the front wall of the housing by means of three blocks 312 corresponding to locking means. The blocks 312 are fixedly attached to the internal front wall of the housing and make it possible to keep the shutters close to the internal front wall of the housing in order to partially close the passage through-hole during movement of the machining tool.

According to this embodiment, the machining head 210 is carried by a frame 214 which moves along the runners in order to move said machining tool 211. A bearing rail 313 is fixedly attached to the first leaf which is superimposed on the second leaf of the shutter. This bearing rail 313 makes it possible to bring at least one leaf of each shutter into contact with the means 213 for moving the machining tool and more particularly the frame 214 supporting the machining head which moves along the runners. Furthermore, a stud-type steel cylinder 314 fixed to the frame 214 makes it possible to exert a force on the first leaf and makes it possible to guide the shutter in order to cause the movement of the leaves of each shutter when the machining tool is moved.

As illustrated by FIG. 1 and according to this embodiment, the chassis 103 comprises an opening 104 facing the air passage through-hole 305 arranged in the housing 200 in order to bring the passage section S1 delimited by the partial closure shutters 310 into fluid communication with the aspirating channel 321. The aspirating device 320 comprises an opening 104 which issues in the vicinity of the outlet 302, an aspirating channel 321 and a collector 322. As illustrated in the diagram of FIG. 4, this device makes it possible to drive the chips produced by machining and repelled by the air flow directly into the aspirating channel 321 connected to the collector 322. The aspirating device preferably comprises an aspirating motor connected to an aspirating channel 321. This motor is configured to generate an aspirating force at the opening of the channel, which is arranged in the vicinity of the outlet through-hole 302.

Thus, when the machining tool 211 machines the piece of wood 10, the air flow entering via the inlet 301 and flowing in the flow channel 303 expels the chips produced by the machining out of the enclosure of the machining device via the outlet 302. The chips enter the opening 104 in the chassis before being aspirated by the aspirating channel 321 towards the chip collector 322. The chip collector is a receptacle in which the chips are poured, which can be arranged in the workshop or at a distance from the machining device.

The invention claimed is:

1. A device for machining a workpiece comprising a housing delimiting an enclosure, at least one machining head carrying a machining tool housed in said housing, and means for moving said machining tool on at least one Y axis, and an air system for evacuating the chips produced during the machining of said workpiece, said air system comprising:
    an air inlet and an air outlet which are provided in said housing and an air flow channel which extends between the air inlet and outlet;
    a means for causing an air flow to flow in said air flow channel between the inlet and outlet; and
    an air passage through-hole delimiting said air outlet through which said machining tool extends so that said air flow caused to flow in said air channel can be expelled from said housing through said through-hole in order to repel said chips produced by said machining tool during the machining of said workpiece out of said enclosure of said housing; and
    at least one shutter for partial closure of said air passage through-hole defining an air passage section S, said at least one shutter being movable with respect to said through-hole so as to be able to delimit an air passage section S1 limiting said air passage section S which makes it possible to increase the speed of the air flow expelled from said housing via said air outlet.

2. The machining device as claimed in claim 1 wherein said machining head comprises an actuator for said machining tool housed in said air flow channel.

3. The machining device as claimed in claim 1 wherein said air passage through-hole is of an oblong shape, extending on said at least one Y axis.

4. The machining device as claimed in claim 1, further comprising means for returning each closure shutter, which are mechanically connected to said means for moving said machining tool on said Y axis so as to permit the concomitant movement of each partial closure shutter and of said machining tool in order to keep said air passage section S1 constant.

5. The machining device as claimed in claim 4, further comprising a first and a second shutter and in that said means for returning each partial closure shutter comprise at least one return spring configured to keep said first shutter at a distance from said second shutter so as to keep said air flow passage section S1 constant when said means for moving said machining tool are actuated.

6. The machining device as claimed in claims 1, wherein said air system further comprises an aspirating device comprising a chip collector connected to an aspirating channel opening in the vicinity of said air passage through-hole in order to permit entry of the chips produced during the machining and repelled by said air flow expelled from said housing towards said collector.

7. The machining device as claimed in claim 1, wherein said workpiece is a piece of wood.

* * * * *